(12) United States Patent
Bell et al.

(10) Patent No.: US 9,208,781 B2
(45) Date of Patent: Dec. 8, 2015

(54) ADAPTING SPEECH RECOGNITION ACOUSTIC MODELS WITH ENVIRONMENTAL AND SOCIAL CUES

(71) Applicant: International Business Machines Corporation, Armonk, NY (US)

(72) Inventors: Denise A Bell, Austin, TX (US); Lisa Seacat DeLuca, San Francisco, CA (US); Jana H Jenkins, Raleigh, NC (US); Jeffrey A Kusnitz, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 13/857,571

(22) Filed: Apr. 5, 2013

(65) Prior Publication Data

US 2014/0303970 A1    Oct. 9, 2014

(51) Int. Cl.
*G10L 15/20* (2006.01)
*G10L 15/24* (2013.01)
*G10L 15/00* (2013.01)

(52) U.S. Cl.
CPC ............. *G10L 15/20* (2013.01); *G10L 15/00* (2013.01); *G10L 15/24* (2013.01)

(58) Field of Classification Search
None
See application file for complete search history.

(56) References Cited

U.S. PATENT DOCUMENTS

| | | | |
|---|---|---|---|
| 5,684,924 A * | 11/1997 | Stanley et al. | 704/233 |
| 5,970,446 A * | 10/1999 | Goldberg et al. | 704/233 |
| 6,389,393 B1 | 5/2002 | Gong | |
| 6,505,161 B1 * | 1/2003 | Brems | 704/270 |
| 7,266,494 B2 | 9/2007 | Droppo et al. | |
| 7,996,220 B2 | 8/2011 | Rose et al. | |
| 8,234,111 B2 | 7/2012 | Lloyd et al. | |
| 2002/0046022 A1 * | 4/2002 | Rose et al. | 704/231 |
| 2004/0138882 A1 | 7/2004 | Miyazawa | |
| 2007/0033034 A1 | 2/2007 | Yao | |
| 2008/0300871 A1 * | 12/2008 | Gilbert | 704/233 |
| 2010/0088093 A1 | 4/2010 | Lee et al. | |
| 2011/0022292 A1 * | 1/2011 | Shen et al. | 701/200 |
| 2011/0311144 A1 | 12/2011 | Tardif | |
| 2012/0123777 A1 | 5/2012 | Agapi et al. | |

FOREIGN PATENT DOCUMENTS

| | | |
|---|---|---|
| EP | 1445759 A1 | 8/2004 |
| JP | 2006030880 A | 2/2006 |

OTHER PUBLICATIONS

Chen et al. "Speaker, Environment and Channel Change Detection and Clustering Via the Bayesian Information Criterion" Proceedings of DARPA Broadcast News Transcription and Understanding Workshop (1998), 6 pages.

* cited by examiner

*Primary Examiner* — Jialong He
*Assistant Examiner* — Yi-Sheng Wang
(74) *Attorney, Agent, or Firm* — Jeffrey T. Holman (57) ABSTRACT

An acoustic model adaptation system includes a memory device and a model selector engine coupled to the memory device. The model selector engine is configured to compile information of environmental conditions to identify a current speech environment for audio input into a speech recognizer on a device. The model selector engine is further configured to compare the information of the environmental conditions with profiles of acoustic models. Each profile associates with an acoustic model. Each acoustic model compensates for background noise or acoustical distortions of the audio input. The model selector engine is further configured to select a first acoustic model for the speech recognizer based on the information of the environmental conditions exclusive of audio input from the user.

17 Claims, 5 Drawing Sheets

ADAPTING SPEECH RECOGNITION ACOUSTIC MODELS WITH ENVIRONMENTAL AND SOCIAL CUES

BACKGROUND

Speech recognition systems translate a speaker's words into digital content or commands. Speech recognition systems are sensitive to their audio input. Background noise and acoustical distortions affect the performance of speech recognition systems. To overcome background noise and acoustical distortions, several techniques are employed. Many large vocabulary speech recognizers require a training process where the user dictates some number of predefined sentences. This training process builds an acoustic model that helps the system to understand not just how the user speaks, but also the background noise and acoustical distortions.

SUMMARY

Embodiments of a system are described. In one embodiment, an acoustic model adaptation system includes a memory device and a model selector engine coupled to the memory device. The model selector engine is configured to compile information of environmental conditions to identify a current speech environment for audio input into a speech recognizer on a device. The model selector engine is further configured to compare the information of the environmental conditions with profiles of acoustic models. Each profile associates with an acoustic model. Each acoustic model compensates from background noise or acoustical distortions of the audio input. The model selector engine is further configured to select a first acoustic model for the speech recognizer based on the information of the environmental conditions exclusive of audio input from the user. Other embodiments of the system are also described, as well as embodiments of a computer program product and a method.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate selecting effective acoustic models by compiling environmental cues without the aid of audio inputs or inputs from a user. Acoustic models compensate for background noise and acoustical distortions and allow a speech recognition system or speech recognizer to distinguish the speaker from other noise. Acoustic models vary. An acoustic model that is designed for a noisier environment may not perform well in a quieter environment or vice versa.

In some conventional systems and methods, speech recognizers improve the performance of acoustic models by employing a training process where a user sits down and dictates predefined sentences. During the training process, the speech recognizer will learn how a user speaks and build an acoustic model accounting for the environment in which the user speaks. As the user continues to use the system, the speech recognizer adapts the acoustic model. While the ongoing adaptation may be beneficial in many instances, the ongoing adaptation may negatively affect the performance of the speech recognizer if the environment is changing or varies too much. Changes in the user's style of speaking or changes in microphones may also negatively impact the speech recognizer. In many instances, speech recognizers use audio input or other user manual inputs to learn about the audio environment.

Some embodiments described herein involve compiling information of environmental conditions, exclusive of audio input from a user, to identify a current speech environment for audio input into a speech recognizer on a device. Environmental conditions may include the number of persons nearby, an estimate of the number of persons nearby, the location of the device, the time, the date, the number of devices nearby, the likely identity of persons nearby, the identity of the user, the microphone or audio input device to be used, and other similar conditions. Some embodiments allow the speech recognizer to determine the current speech environment before receiving any audio inputs. Some embodiments allow the speech recognizer to determine the current speech environment before receiving any manual inputs indicating the current speech environment. Some embodiments described herein involve comparing the information of the environmental conditions with the profiles of acoustic models. In some embodiments, each profile associates with an acoustic model. In some embodiments, each acoustic model varies in compensating for background noise and/or acoustical distortions of the audio input. Some embodiments allow the speech recognizer to predict the current noise environment. Some embodiments described herein involve selecting a first acoustic model for the speech recognizer based on the information of the environmental conditions exclusive of audio input from the user. Some embodiments allow the system to predict changes in the noise environment prior to receiving audio input. Some embodiments allow the system to operate efficiently by correctly selecting the appropriate acoustic model.

Figure 1:
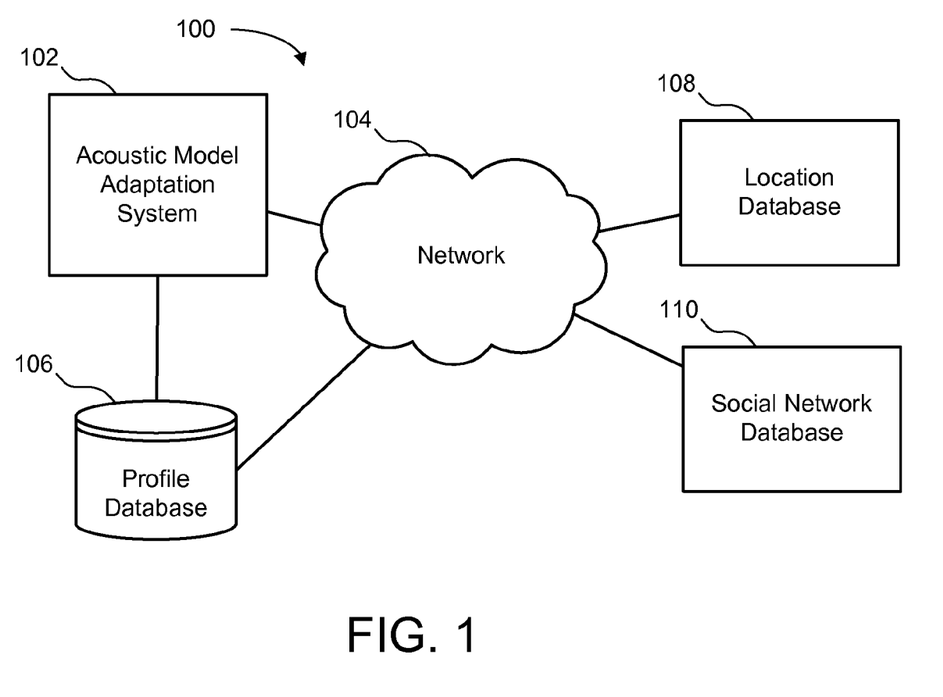
FIG. 1 depicts a schematic diagram of one embodiment of a system for selecting acoustic models for a speech recognizer.

FIG. 1 depicts a schematic diagram of one embodiment of a system for selecting acoustic models for a speech recognizer 100. The system for selecting acoustic models for a speech recognizer 100 includes an acoustic model adaptation system 102, a network 104, and profile database 106. Some embodiments include a location database 108 and a social network database 110.

In some embodiments, the system 100 compiles information of environmental conditions from over the network 104. In some embodiments, the system 100 compiles information from a location database 108. In some embodiments, the system 100 compiles information from a social network database 110. In some embodiments, the system 100 compares the compiled information from the location database 108 or the social network database 110 with profiles in the profile database 106. In some embodiments, the network 104 may be at least in part the Internet. In other embodiments, the network 104 may be a private network or an intranet. The network 104 may be a combination of Internet, a private network, or an intranet. In some embodiments the acoustic model adaptation system 102, the profile database 106, the location database 108, and the social network database 110 may be directly linked to one another. For example the acoustic model adaptation system 102 and the location database 108 may be directly linked together along with the profile database 106. The acoustic model adaptation system 102 may directly communicate with the location database 108 or may communicate over the network 104.

The acoustic model adaptation system 102 may be a single device or a combination of devices. The acoustic model adaptation system 102 may be located on a mobile phone, a smart phone, a portable media device, a tablet computer, a laptop computer, a desktop computer, or other device, or a combination of devices. Although the system 100 is shown and described with certain components and functionality, other embodiments of the system 100 may include fewer or more components to implement less or more functionality.

Figure 2:
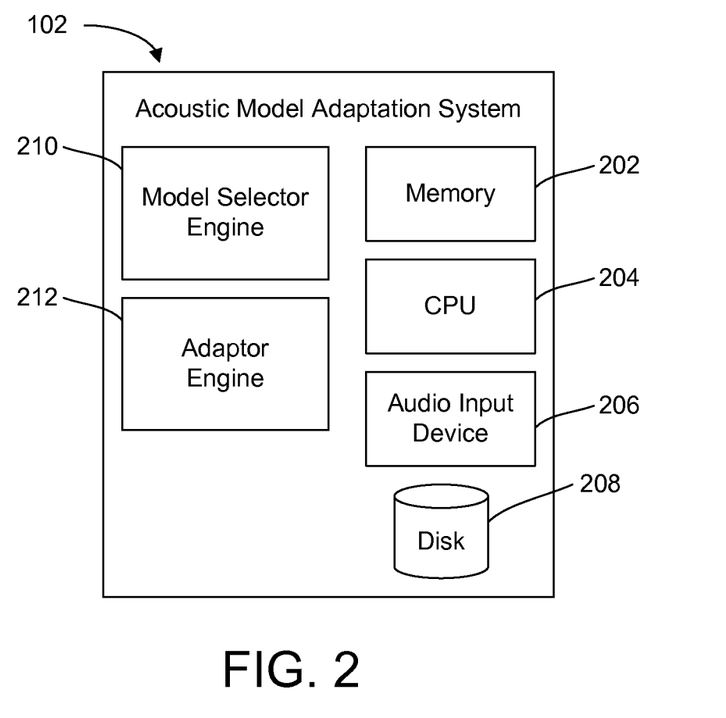
FIG. 2 depicts a schematic diagram of one embodiment of the acoustic model adaptation system of FIG. 1.

FIG. 2 depicts a schematic diagram of one embodiment of the acoustic model adaptation system 102 of FIG. 1. The depicted acoustic model adaptation system 102 includes various components, described below, that are capable of performing the functions and operations described herein. The illustrated acoustic model adaptation system 102 includes a computer memory device 202, a processing device 204, an audio input 206, and a disk storage device 208. The illustrated acoustic model adaptation system 102 also includes a model selector engine 210 and an adaptor engine 212. Some or all of the components of the acoustic model adaptation system 102 may be stored on a single computing device or on a network of computing devices, including a wireless communication network. In some embodiments, some or all of the components of the acoustic model adaptation system 102, and the profile database 106, the location database 108, and the social network database 110 are stored on a single computing device. In other embodiments, some or all of the components of the acoustic model adaptation system 102 are stored on more than one computing device. The acoustic model adaptation system 102 may be a single device such as a mobile phone, a smart phone, a portable media device, a tablet computer, a laptop computer, a desktop computer, or other device or a combination of devices. Although the acoustic model adaptation system 102 is shown and described with certain components and functionality, other embodiments of the acoustic model adaptation system 102 may include fewer or more components to implement less or more functionality.

The computer memory device 202 may store data and/or software instructions or computer program instructions for carrying out the operations described herein. The computer memory device 202 may be external or internal to the system and may include but is not limited to a hard drive, a CD/DVD recordable drive, a magnetic tape drive, a disk cartridge drive, a secure digital card, another type of magnetic or optical drive, a solid-state drive, or another type of memory device. The processing device 204 is connected to and in communication with the memory device 202 and may store and access data on the memory device 202 for performing the operations described herein. The processor or processing device 204 may also be connected to the disk storage device 208. The disk storage device 208 may be implemented to temporarily store data or software instructions from the memory device 202 or the processor 204. The disk storage device 208 may include but is not limited to a hard disk drive, a floppy disk drive, a removable floppy disk, or other type of optical or magnetic drive. The functionality of the model selector engine 210 and the adaptor engine 212 may be implemented by computer program instructions stored on the computer memory device 202 and executed by the processing device 204 such as a CPU. The audio input device 206 may be any type of microphone or audio input device capable of converting sound into a computer readable signal. In some embodiments, the model selector engine 210 and the adaptor engine 212 are coupled to the memory device 202.

In some embodiments, the model selector engine 210 is configured to compile information of environmental conditions, exclusive of audio input from a user, to identify a current speech environment for audio input into a speech recognizer on a device. In some embodiments, the model selector engine 210 is configured to compare information of environmental conditions with profiles of acoustic models. In some embodiments, each profile associates with an acoustic model. In some embodiments, each profile associates with a unique acoustic model. In some embodiments, each acoustic model compensates for background noise and/or acoustical distortions of an audio input. In some embodiments, the model selector engine 210 is configured to select a first acoustic model for the speech recognizer based on the information of environmental conditions. In some embodiments, the model selector engine 210 is configured to select a first acoustic model for a speech recognizer based on information of environmental conditions exclusive of audio input from a user.

In some embodiments, the model selector engine 210 is further configured to identify a location of the device. Determining a location of the device may be accomplished through various means well known including employing global positioning system (GPS) or other global navigation satellite system (GNSS), determining the network to which the device is connected, employing a localization-based system, utilizing multilateration of radio signals, determining a microphone digital ID (i.e. a car microphone digital ID indicates the device is in a car), or another system for determining the location of a device. Determining the location of a device allows the acoustic model adaptation system 102 to derive information about the environmental conditions including the likely background noise and acoustical distortions. For example, a library will have light background noise, a sports arena will have loud background noise, a moving car will be loud, a parked car will be quieter, and a certain building may have an echo. Some embodiments will compile information of the time and/or date in addition to a location. An office building may be noisy during business hours and quiet after hours and on the weekend. A restaurant may be noisy in the evenings and quiet in the early afternoon. A sports arena may be loud during a scheduled event and quiet when no event is scheduled. A park may be quieter in the early morning. Additionally, determining the location of a device allows the acoustic model adaptation system 102 to determine the likely noise level of the user. For example, a user may speak softly in a library and loud in an office.

In some embodiments, the model selector engine 210 is further configured to compare the location of the device with a location database 108. A location database 108 may include a map or information about locations such as the type of location (library, home, restaurant, etc.), the hours of operation, scheduled events, and/or history of background noise and acoustical distortions.

In some embodiments, the model selector engine 210 is configured to determine an estimate of a number of persons within a certain distance of the device. Determining an estimate of a number of persons within a certain distance of the device may be accomplished in various ways. The model selector engine 210 may determine the estimate of the number of persons by compiling information of social network statistics. For example, social networks allow users to "check in" at a location or event virtually on the social network (i.e. foursquare, facebook, etc.). After determining the number of users "checked in" at a location, the model selector engine 210 can determine the type of environment the user is in (e.g. noisy, quiet, etc.). The larger the number of persons individuals in a location the louder the location. The model selector engine 210 may determine the estimate of the number of persons by compiling information of the number of local wireless devices. For example, the model selector engine 210 may check a local network to determine the number of wireless and/or wired devices connected to the local network. The model selector engine 210 may poll a cell tower to determine the number of cell phones nearby.

In some embodiments, the model selector engine 210 may determine the identity of persons nearby by compiling information of social networks or wireless devices. The identity of persons may affect the noise level of the user speaking into the audio input device 206. For example, determining that a business competitor is nearby may indicate that the user will speak softly so as not to allow the business competitor to hear the audio input.

Some embodiments include an adaptor engine 212 coupled to the memory device 202. In some embodiments, the adaptor engine 212 is configured to create a new acoustic model associated and a new profile in response to detection of acoustic characteristics of the audio input different from the selected first profile by a predetermined threshold. In some instances, the actual audio input may vary from the selected acoustic model after the model selector engine 210 selects a first acoustic model and the user begins use of the speech recognizer. The differences may be measured in signal to noise ratio, overall sound level, a peak sound level, or other measurable differences in the signal. The threshold may be a range or a certain percentage difference between the acoustic model and the actual audio input.

In some embodiments, the adaptor engine is further configured to adjust the new acoustic model to match the acoustic characteristics of the audio input. In some embodiments, the adaptor engine is configured to adjust an existing acoustic model. The acoustic model may be updated and continually adjusted to more accurately reflect the environment of the audio input.

In addition to the advantages which may be achieved by implementation of the individual components of the acoustic model adaptation system 102, some embodiments of the acoustic model adaptation system 102 provide additional advantages over conventional technology. For example, some embodiments of the acoustic model adaptation system 102 allow selection of an acoustic model based on environmental conditions without the aid of audio input. Some embodiments allow a speech recognizer to anticipate the background noise and acoustical distortions before capturing an audio input. Some embodiments allow for targeted acoustic model updating. Some embodiments allow the updating of acoustic models for similar environments by avoiding updating an acoustic model for an incompatible environment. Some embodiments allow selection of an appropriate acoustic model before capturing audio input and avoid corruption of other acoustic models with a changing environment.

Figure 3:
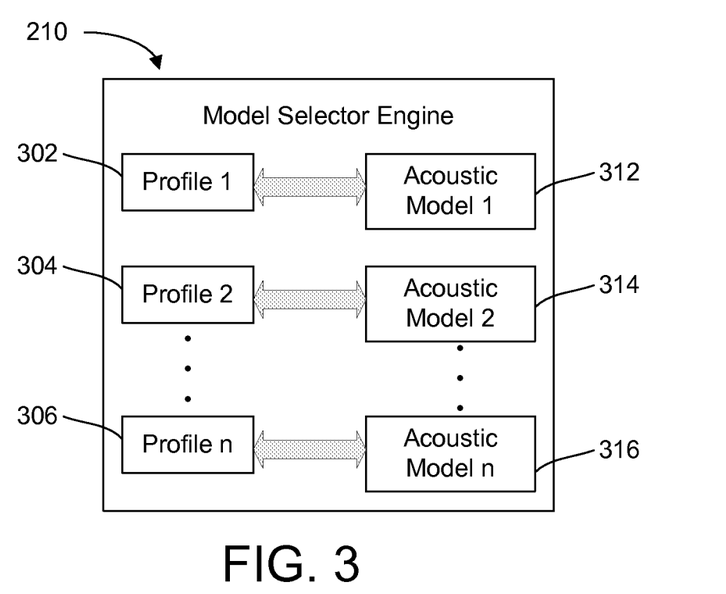
FIG. 3 depicts one embodiment of the model selector engine of FIG. 2.

FIG. 3 depicts one embodiment of the model selector engine 210 of FIG. 2 including profiles 302-306 and acoustic models 312-316. In some embodiments, the model selector engine 210 associates profiles 302-306 with acoustic models 312-316. In some embodiments, each profile is associated with a unique acoustic model. In the illustrated embodiment, profile 1 302 is associated with acoustic model 1 312. Profile 2 304 is associated with acoustic model 2 314. Profile n 306 is associated with acoustic model n 316. In some embodiments, more than one profile 302-306 may be associated with an acoustic model 312.

The profile 302 may indicate parameters of an environment. By way of example, the profile 302 may indicate a range of persons present. Profile 302 may be for when no other person other than the user is nearby. Profile 304 may be for when 5 or fewer persons are nearby. Profiles may overlap or indicate the same numbers of persons and be distinguished by another environmental condition such as time, date, location, etc. For example, profile 302 and 304 may both be for when 5 or fewer persons are nearby but profile 302 is for typically quiet locations such as a library or home office and profile 304 is for noisier locations such as a business location during operating hours. Profiles may be as detailed as needed to compare with the information of environmental conditions. Some embodiments may include one, some, or all the environmental conditions as parameters. For example, the profiles 302-306 may only indicate locations in one embodiment. The profiles 302-306 may indicate a time and locations in one embodiment. As will be appreciated by one skilled in the art, any number of combinations of parameters may be indicated by the profiles 302-306. In some embodiments, each profile 302-306 associates with a unique acoustic model 312-316. In some embodiments, more than one profile may associate with a single acoustic model 312.

Acoustic models 312-316 compensate for background noise and/or acoustical distortions of the audio input. As will be appreciated by those skilled in the art, the compensation may be accomplished through many different algorithms to clean up the audio input signal.

Figure 4:
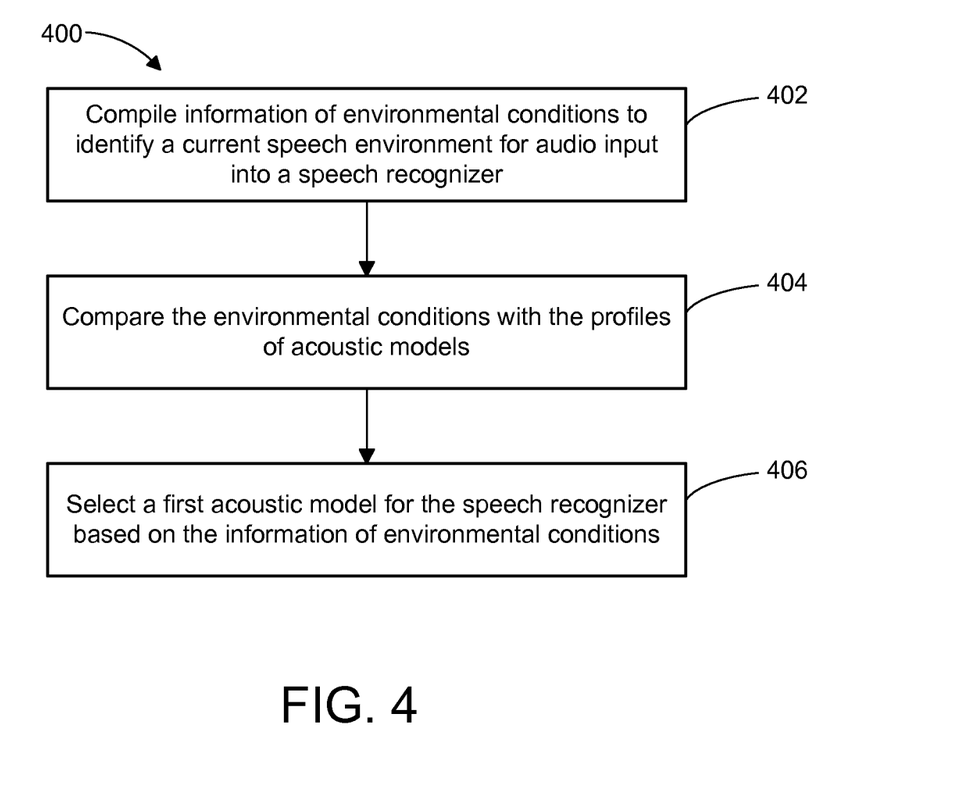
FIG. 4 depicts a flow chart diagram of one embodiment of a method for selecting a speech recognition acoustic model without the aid of audio input.

FIG. 4 depicts a flow chart diagram of one embodiment of a method 400 for selecting a speech recognition acoustic model 312 without the aid of audio input. Although the method 400 for selecting a speech recognition acoustic model 312 is described in conjunction with the acoustic model adaptation system of FIGS. 1-2 and the model selector engines of FIGS. 2-3, embodiments of the method 400 may be implemented with other types of computer systems.

At 402, information of environmental conditions is compiled to identify a current speech environment for audio input into a speech recognizer. In some embodiments, the information of environmental conditions is compiled exclusive of audio input. At 404, the information of environmental conditions is compared with the profiles 302-306 of acoustic models 312-316. At 406, a first acoustic model 312 for the speech recognizer is selected based on the information of environmental conditions. In some embodiments, the selection is based on information of environmental conditions exclusive of audio input by a user. In some embodiments, the selection is based on information of environmental conditions exclusive of manual inputs by the user. The depicted method 400 for selecting a speech recognition acoustic model 312 then ends.

Figure 5:
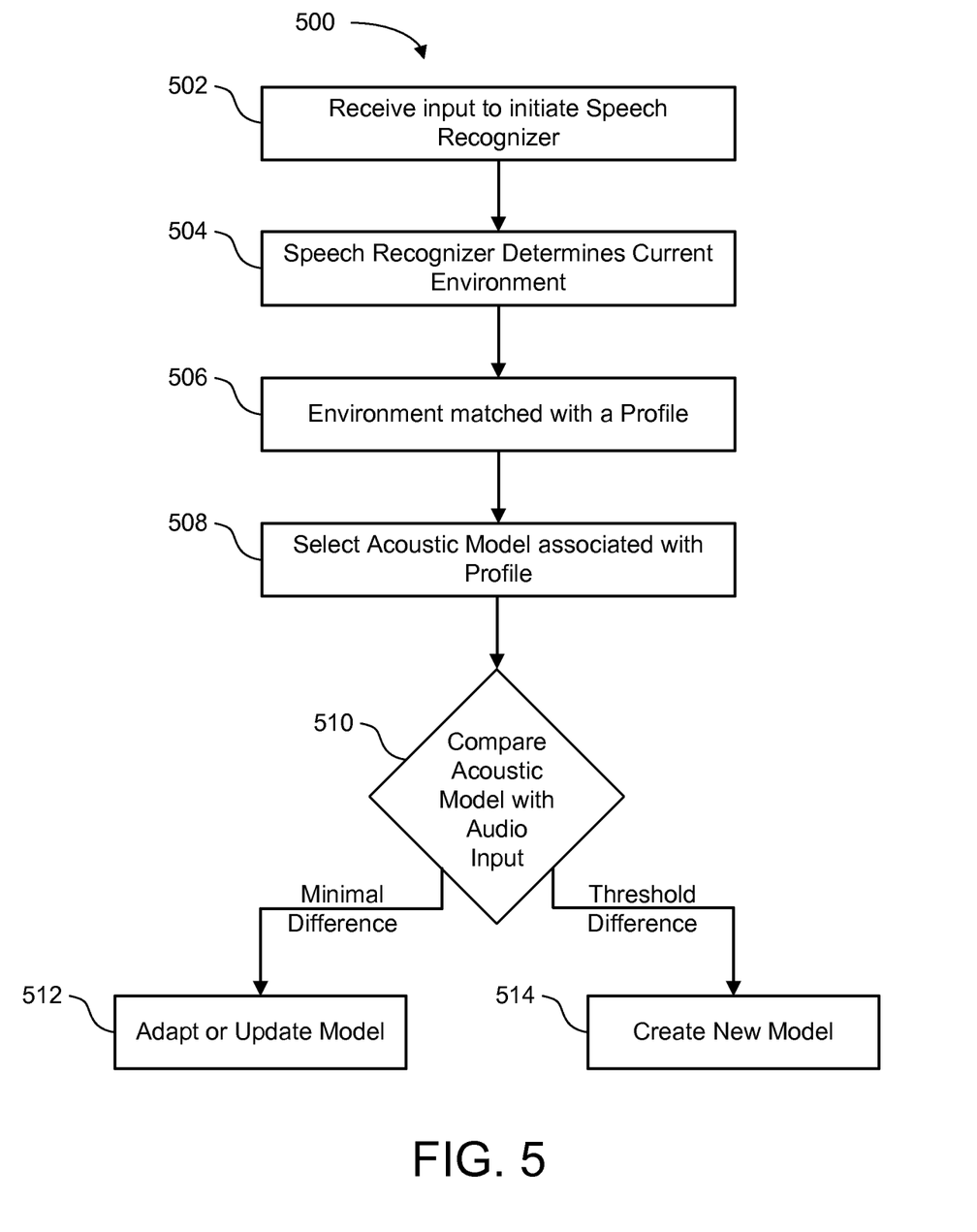
FIG. 5 depicts a flow chart diagram of another embodiment of a method for selecting and adapting a speech recognition acoustic model.

FIG. 5 depicts a flow chart diagram of another embodiment of a method 500 for selecting and adapting a speech recognition acoustic model 312. Although the method 500 for selecting and adapting a speech recognition acoustic model 312 is described in conjunction with the acoustic model adaptation system of FIGS. 1-2 and the model selector engines of FIGS. 2-3, embodiments of the method 500 may be implemented with other types of computer systems.

At 502, an input is received to initiate a speech recognizer. At 504, the speech recognizer determines the current environment. In some embodiments, the speech recognizer may follow the method for compiling information of environmental conditions 600, described more fully below, to determine the current environment. At 506, the environment is matched with a profile 302. At 508, the acoustic model 312 associated with the profile 302 is selected. At 510, the acoustic model 312 is compared with the audio input. If the difference between the acoustic model 312 and the audio input is below a threshold, the acoustic model is adapted or updated 512. If the difference between the acoustic model 312 and the audio input is above a threshold, a new model may be created 514. The depicted method 500 for selecting and adapting a speech recognition acoustic model 500 then ends.

Figure 6:
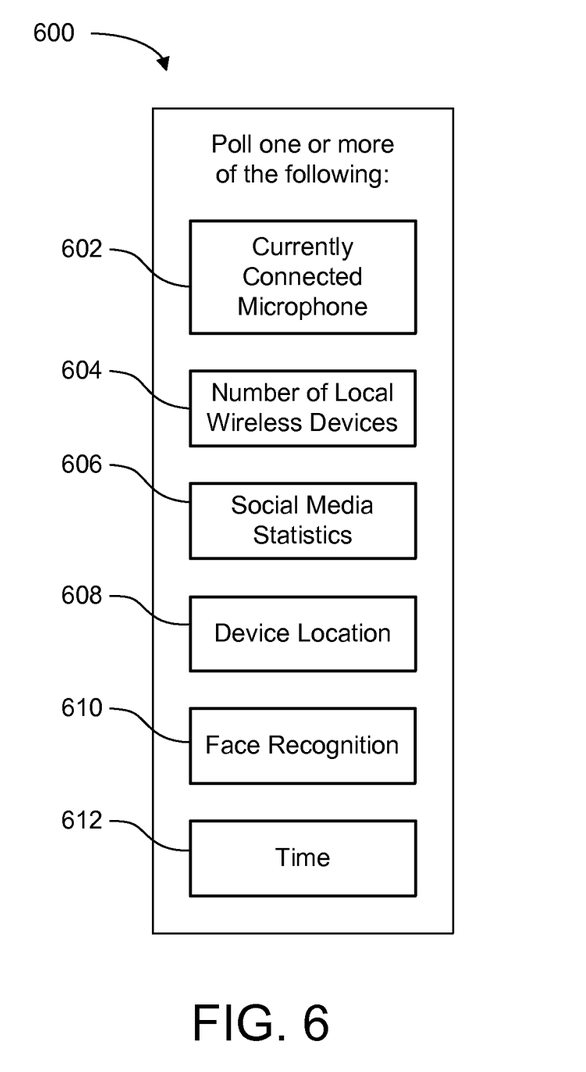
FIG. 6 depicts a flow chart diagram of one embodiment of a method for compiling information of environmental conditions of an audio input.

FIG. 6 depicts a flow chart diagram of one embodiment of a method for compiling information of environmental conditions 600 of an audio input. The method includes polling various sources of information and may include polling one, some, or all the sources of information. Some embodiments include polling a currently connected microphone 602. Microphones have a digital ID, allowing the system 102 to determine the microphone 206 connected to the device. In some instances, determining the microphone indicates the location. For example, a car microphone indicates the user is in a car, while another microphone ID may indicate the user is in a home office. In some embodiments, the microphone 206 may indicate differences in the captured audio input as the different microphones 206 function differently and may capture more or less background noise. In such instances, although the location of the user may be the same with two different microphones 206 but the microphone 206 connected may require a different acoustic model 312 because of differences in performance.

Some embodiments include polling information sources for a number of local wireless devices 604. In some embodiments, a router or server may indicate the number of devices connected to a network indicating an estimate of the number of persons nearby the user. In some embodiments, a wireless tower may indicate the number of devices in an area indicating an estimate of the number of persons nearby the user. Some embodiments include polling social media statistics 606. In some embodiments, the system 102 may poll a particular social media site or may poll a database 110, updated with pertinent social media statistics. As an example, a social media site may allow users to "check in" or otherwise indicate the user's presence at a location or event. By determining the number of social media user's present at a location the system 102 may estimate the number of persons nearby the speech recognizer user.

Some embodiments include polling information sources for a device location 608. In some embodiments, the device location may be determined by GPS or another similar system. The device location may be determined by polling network connections (e.g. home network, work network, Wi-Fi). As discussed above, the microphone digital ID may indicate the device location. The device location may be determined by multilateration of radio signals. As will be appreciated by one skilled in the art, determining the location of a device may be accomplished in many different ways and for the sake of brevity only a few examples are set forth.

Some embodiments include polling a camera with face recognition capability 610 to determine an estimate of the number of persons nearby a user. Face recognition may indicate a number of persons within the camera's view. Some embodiments include polling information sources for the time 612. Some embodiments include polling information sources for the date. The time and/or date can provide additional information of the environmental conditions. For example, the time or date may indicate the number of people in a location of the likely level of background noise. The time and/or date may be determined from the device itself or from a source on the network.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

An embodiment of an acoustic model adaptation system includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product comprising:
   a non-transitory computer useable storage medium including a computer readable program, wherein the computer readable program includes instructions that, when executed by a processing device within a computer, cause the computer to perform operations comprising:
      compiling information of environmental conditions, exclusive of audio input, to identify a current speech environment for audio input into a speech recognizer on a device, wherein compiling the information of the environmental conditions comprises determining an estimate of a number of persons within a certain distance of the device, wherein determining the estimate of the number of persons within the certain distance of the device comprises compiling information of a number of local wireless devices within the distance of the device;
      comparing the information of the environmental conditions with profiles of acoustic models, wherein each profile associates with an acoustic model, and wherein each acoustic model compensates for background noise or acoustical distortions of the audio input; and
      selecting a first acoustic model for the speech recognizer based on the information of the environmental conditions exclusive of audio input.

2. The computer program product of claim 1, wherein the operations further comprise creating a new acoustic model and a new profile in response to detecting acoustic characteristics of the audio input different from the selected first profile by a predetermined threshold.

3. The computer program product of claim 2, wherein the operations further comprise adjusting the new acoustic model to match the acoustic characteristics of the audio input.

4. The computer program product of claim 1, wherein determining the estimate further comprises compiling information of social network statistics.

5. The computer program product of claim 1, wherein compiling the information of the environmental conditions comprises identifying a location of the device and comparing the location of the device with a location database.

6. The computer program product of claim 1, wherein compiling the information of the environmental conditions comprises detecting a microphone connected to the device to determine a location of the device.

7. A method for adapting speech recognition acoustic models, the method comprising:
   compiling information of environmental conditions, exclusive of audio input, to identify a current speech environment for audio input into a speech recognizer on a device, wherein compiling the information of the environmental conditions comprises determining an estimate of a number of persons within a certain distance of the device, wherein determining the estimate comprises compiling information of social network statistics;
   comparing the information of the environmental conditions with profiles of acoustic models, wherein each profile associates with an acoustic model, and wherein each acoustic model compensates for background noise or acoustical distortions of the audio input; and
   selecting a first acoustic model for the speech recognizer based on the information of the environmental conditions exclusive of audio input.

8. The method of claim 7, wherein the method further comprises creating a new acoustic model and a new profile in response to detecting acoustic characteristics of the audio input different from the selected first profile by a predetermined threshold.

9. The method of claim 8, wherein the method further comprises adjusting the new acoustic model to match the acoustic characteristic of the audio input.

10. The method of claim 7, wherein determining the estimate further comprises compiling information of a number of local wireless devices within the distance of the device.

11. The method of claim 7, wherein compiling the information of the environmental conditions comprises identifying a location of the device and comparing the location of the device with a location database.

12. The method of claim 7, wherein compiling the information of the environmental conditions comprises detecting a microphone connected to the device to determine a location of the device.

13. An acoustic model adaptation system, the system comprising:
a memory device, and
a model selector engine coupled to the memory device, the model selector engine configured to:
compile information of environmental conditions, exclusive of audio input from a user, to identify a current speech environment for audio input into a speech recognizer on a device;
compare the information of the environmental conditions with profiles of acoustic models, wherein each profile associates with an acoustic model, and wherein each acoustic model compensates for background noise or acoustical distortions of the audio input;
select a first acoustic model for the speech recognizer based on the information of the environmental conditions exclusive of audio input from the user; and
determine an estimate of a number of persons within a certain distance of the device by compilation of information of a number of local wireless devices.

14. The system of claim 13, wherein the system further comprises an adaptor engine coupled to the memory device, the adaptor engine configured to create a new acoustic model and a new profile in response to detection of acoustic characteristics of the audio input different from the selected first profile by a predetermined threshold.

15. The system of claim 14, wherein the adaptor engine is further configured to adjust the new acoustic model to match the acoustic characteristics of the audio input.

16. The system of claim 13, wherein the model selector engine is further configured to determine an estimate of a number of persons within a certain distance of the device by compilation of information of social network statistics.

17. The system of claim 13, wherein the model selector engine is further configured to identify a location of the device and compare the location of the device with a location database.

* * * * *